(12) United States Patent
Chan et al.

(10) Patent No.: US 8,607,320 B2
(45) Date of Patent: Dec. 10, 2013

(54) SYSTEMS, METHODS AND COMPUTER-READABLE MEDIA FOR REGULATING REMOTE ACCESS TO A DATA NETWORK

(75) Inventors: Frank Siu Hong Chan, Scarborough (CA); Jeffrey Emmeti Regan, London (CA); Jonathan Stephen Curtis, Carleton Place (CA); Edwin Thomas Allum, Mississauga (CA); James Ashley Van Kessel, Newmarket (CA); Manuel Lopes Branco, Oakville (CA); Darren David Goller, Toronto (CA); Calvin Chun Kit Chow, Toronto (CA)

(73) Assignee: BCE Inc., Verdun, Québec (CA)

( * ) Notice: Subject to any disclaimer, the term of this patent is extended or adjusted under 35 U.S.C. 154(b) by 0 days.

(21) Appl. No.: 13/183,328

(22) Filed: Jul. 14, 2011

(65) Prior Publication Data
US 2011/0271337 A1 Nov. 3, 2011

Related U.S. Application Data

(63) Continuation of application No. 11/571,027, filed on Dec. 20, 2006, now abandoned.

(51) Int. Cl.
*H04L 29/06* (2006.01)
(52) U.S. Cl.
USPC .......................................................... 726/7
(58) Field of Classification Search
USPC .................................................. 726/4, 7, 28
See application file for complete search history.

(56) References Cited

U.S. PATENT DOCUMENTS

| | | | |
|---|---|---|---|
| 6,678,733 B1 * | 1/2004 | Brown et al. | 709/229 |
| 6,732,179 B1 | 5/2004 | Brown et al. | |
| 2003/0018524 A1 | 1/2003 | Fishman et al. | |
| 2003/0048766 A1 * | 3/2003 | D'Annunzio et al. | 370/338 |
| 2003/0202543 A1 * | 10/2003 | Karlquist et al. | 370/522 |
| 2004/0210633 A1 | 10/2004 | Brown et al. | |
| 2005/0044138 A1 | 2/2005 | Albert et al. | |

(Continued)

FOREIGN PATENT DOCUMENTS

WO WO 02/093837 11/2002

OTHER PUBLICATIONS

International Search Report mailed on Sep. 20, 2006 in connection with International Patent Application PCT/CA2005/001961, 4 pages.

(Continued)

*Primary Examiner* — Jason Gee (57) ABSTRACT

A system, which comprises an authorization controller operable for regulating establishment of user sessions over a data network; a processing subsystem operable for monitoring the user sessions and applying a walled garden policy, wherein application of the walled garden policy respectively associates each user in a certain subset of users with a respective walled garden selected from a common plurality of walled gardens; and a database for storing, in association with each said user in the certain subset of users, a respective identifier corresponding to the respectively associated walled garden. The authorization controller is further operable for responding to receipt of an access request identifying a particular user in the certain subset of users and received from a communication endpoint by (I) consulting the database to identify the walled garden respectively associated with said particular user and (II) directing the communication endpoint to said walled garden respectively associated with said particular user.

28 Claims, 6 Drawing Sheets

(56) References Cited

U.S. PATENT DOCUMENTS

| | | | |
|---|---|---|---|
| 2005/0204050 A1* | 9/2005 | Turley et al. | 709/229 |
| 2005/0246447 A1* | 11/2005 | Smidt et al. | 709/229 |
| 2005/0261970 A1 | 11/2005 | Vucina et al. | |
| 2006/0123481 A1* | 6/2006 | Bhatnagar et al. | 726/24 |

OTHER PUBLICATIONS

What is walled garden?—A Word Definition From the Webopedia Computer Dictionary, 2 pages, http://www.webopedia.com/TERM/W/walled_garden.html.

Walled garden (media)—Wikipedia, the free encyclopedia, 1 page, http://en.wikipedia.org/wiki/Walled_garden_(media).

William Dutcher, PC Week, Oct. 20, 1997, 4 pages, Ziff-Davis Publishing Company.

C. Rigney et al., Remote Authentication Dial in User Service (RADIUS), Apr. 1997, http://www.ietf.org/rfc/rfc2138.txt, 57 pages.

C. de Laat et al., Structure of a Generic AAA Server, Feb. 2001, http://www.aaaarch.org/doc01/generic-structure-00.txt, 7 pages.

Office Action issued on Oct. 19, 2010 in connection with U.S. Appl. No. 11/571,027, 22 pages.

Advisory Action issued on Jan. 31, 2011 in connection with U.S. Appl. No. 11/571,027, 3 pages.

Office Action issued on May 18, 2010 in connection with U.S. Appl. No. 11/571,027, 21 pages.

* cited by examiner

SYSTEMS, METHODS AND COMPUTER-READABLE MEDIA FOR REGULATING REMOTE ACCESS TO A DATA NETWORK

CROSS-REFERENCE TO RELATED APPLICATIONS

This application is a continuation of U.S. patent application Ser. No. 11/571,027, filed on Dec. 20, 2006 now abandoned. The contents of the aforementioned application are incorporated by reference herein.

FIELD OF THE INVENTION

The present invention relates generally to network access and, more particularly, to solutions that allow a provider of access to a data network to better regulate its customers' attempts to access the data network.

BACKGROUND

By equipping customers with a modem that operates over standard telephony lines, Internet service providers (ISPs, including most telephone companies—telcos) are able to offer residential Internet access to a large segment of the general population. Once a customer receives a modem and hooks it up to his or her computer, the customer typically undergoes a setup procedure, whereby the ISP's telephone number is dialed automatically or upon the click of a mouse button. Certain initial data (e.g., username and password) are then requested by the ISP and entered only once by the customer, for the purposes of configuring the modem for all subsequent attempts to remotely access the Internet.

If the modem credentials are correct, i.e., if the modem has been properly configured, then the ISP's authentication servers will allow the customer's computer to access the Internet whenever the customer so wishes, as long as the same modem is utilized to establish the connection to the ISP. If, on the other hand, the ISP's authentication servers determine that the modem credentials are incorrect, then it is still possible for the customer to enter his or her personal account credentials in order to access the Internet, but this needs to be done each time the user attempts to access the Internet, since the modem's credentials will invariably fail.

Unfortunately, ISPs that implement the aforementioned conventional model for accessing the Internet face a number of problems, due in large part to inadequate control of remote access attempts.

For example, it has been observed by ISPs that there will inescapably be a certain percentage of modems in their networks that have been improperly configured, i.e., by entering incorrect credentials during the setup procedure. This leads to repeated failed attempts (and retries) to access the Internet via the ISP's authentication servers, undesirably resulting in a tendency to slow down access to the Internet for a wider customer base.

Another problem arises from the manner in which so-called "management sessions" are initiated, namely through the use of shared "management credentials". Specifically, upon being triggered to submit the management credentials, the modem establishes a connection with a management server over the Internet. Clearly, a malicious party who intercepts or otherwise learns the universal management credentials will be able to enjoy unfettered, unauthorized and anonymous access to the Internet and potentially to the ISP's authentication servers and other equipment.

Furthermore, due to the lack of integration between its accounting department and its network access control equipment, an ISP often finds itself in the position of allowing customers to access the Internet even during times where the customer has not paid for the service. This clearly impacts revenues in a negative way.

In addition, ISPs are often powerless against the spread of viruses or worms over the Internet that its very own customers have released, whether maliciously or as defenseless victims of a hostile self-replicating program.

As present-day access models do not satisfactorily address the above and other issues, there continues to be a need to provide ISPs with greater control of their customers' attempts to remotely access the Internet.

SUMMARY OF THE INVENTION

A first broad aspect of the present invention seeks to provide a system, which comprises an authorization controller operable for regulating establishment of user sessions over a data network; a processing subsystem operable for monitoring the user sessions and applying a walled garden policy, wherein application of the walled garden policy respectively associates each user in a certain subset of users with a respective walled garden selected from a common plurality of walled gardens; and a database for storing, in association with each said user in the certain subset of users, a respective identifier corresponding to the respectively associated walled garden. The authorization controller is further operable for responding to receipt of an access request identifying a particular user in the certain subset of users and received from a communication endpoint by (I) consulting the database to identify the walled garden respectively associated with said particular user and (II) directing the communication endpoint to said walled garden respectively associated with said particular user.

A second broad aspect of the present invention seeks to provide a method, which comprises receiving from a communication endpoint an access request identifying a particular user; consulting a database to identify a walled garden respectively associated with said particular user, the walled garden being one of a plurality of candidate walled gardens; and directing the communication endpoint to said walled garden respectively associated with said particular user.

A third broad aspect of the present invention seeks to provide an authorization controller for use in regulating the establishment of user sessions over a data network. The authorization controller comprises means for receiving from a communication endpoint an access request identifying a particular user; means for consulting a database to identify a walled garden respectively associated with said particular user, the walled garden being one of a plurality of walled gardens; means for directing the communication endpoint to said walled garden respectively associated with said particular user.

A fourth broad aspect of the present invention seeks to provide a computer-readable medium comprising computer-readable program code which, when interpreted by an authorization controller, causes the authorization controller to execute a method of regulating the establishment of user sessions over a data network. The computer-readable program code comprises first computer-readable program code for causing the authorization controller to receive from a communication endpoint an access request identifying a particular user; second computer-readable program code for causing the authorization controller to consult a database to identify a walled garden respectively associated with said particular user, the walled garden being one of a plurality of walled gardens; and third computer-readable program code for causing the authorization controller to direct the communication endpoint to said walled garden respectively associated with said particular user.

A fifth broad aspect of the present invention seeks to provide a method, which comprises monitoring ongoing user sessions between communication endpoints and a data network to obtain session-intrinsic stimuli; receiving session-extrinsic stimuli regarding a certain subset of users; applying a walled garden policy based on the session-intrinsic stimuli and the session-extrinsic stimuli to associate each user in the certain subset of users with a respective walled garden selected from a common plurality of walled gardens; and storing in association with each user in the certain subset of users a respective identifier corresponding to the respectively associated walled garden.

A sixth broad aspect of the present invention seeks to provide a computer-readable medium comprising computer-readable program code which, when interpreted by a walled garden selection module, causes the walled garden selection module to execute a method. The computer-readable program code comprises first computer-readable program code for causing the walled garden selection module to monitor ongoing user sessions between communication endpoints and a data network to obtain session-intrinsic stimuli; second computer-readable program code for causing the walled garden selection module to receive session-extrinsic stimuli regarding a certain subset of users; third computer-readable program code for causing the walled garden selection module to apply a walled garden policy based on the session-intrinsic stimuli and the session-extrinsic stimuli to associate each user in the certain subset of users with a respective walled garden selected from a common plurality of walled gardens; and fourth computer-readable program code for causing the walled garden selection module to store in association with each user in the certain subset of users a respective identifier corresponding to the respectively associated walled garden.

These and other aspects and features of the present invention will now become apparent to those of ordinary skill in the art upon review of the following description of specific embodiments of the invention in conjunction with the accompanying drawings.

It is to be expressly understood that the description and drawings are only for the purpose of illustration of certain embodiments of the invention and are an aid for understanding. They are not intended to be a definition of the limits of the invention.

DETAILED DESCRIPTION OF EMBODIMENTS

Figure 1A:
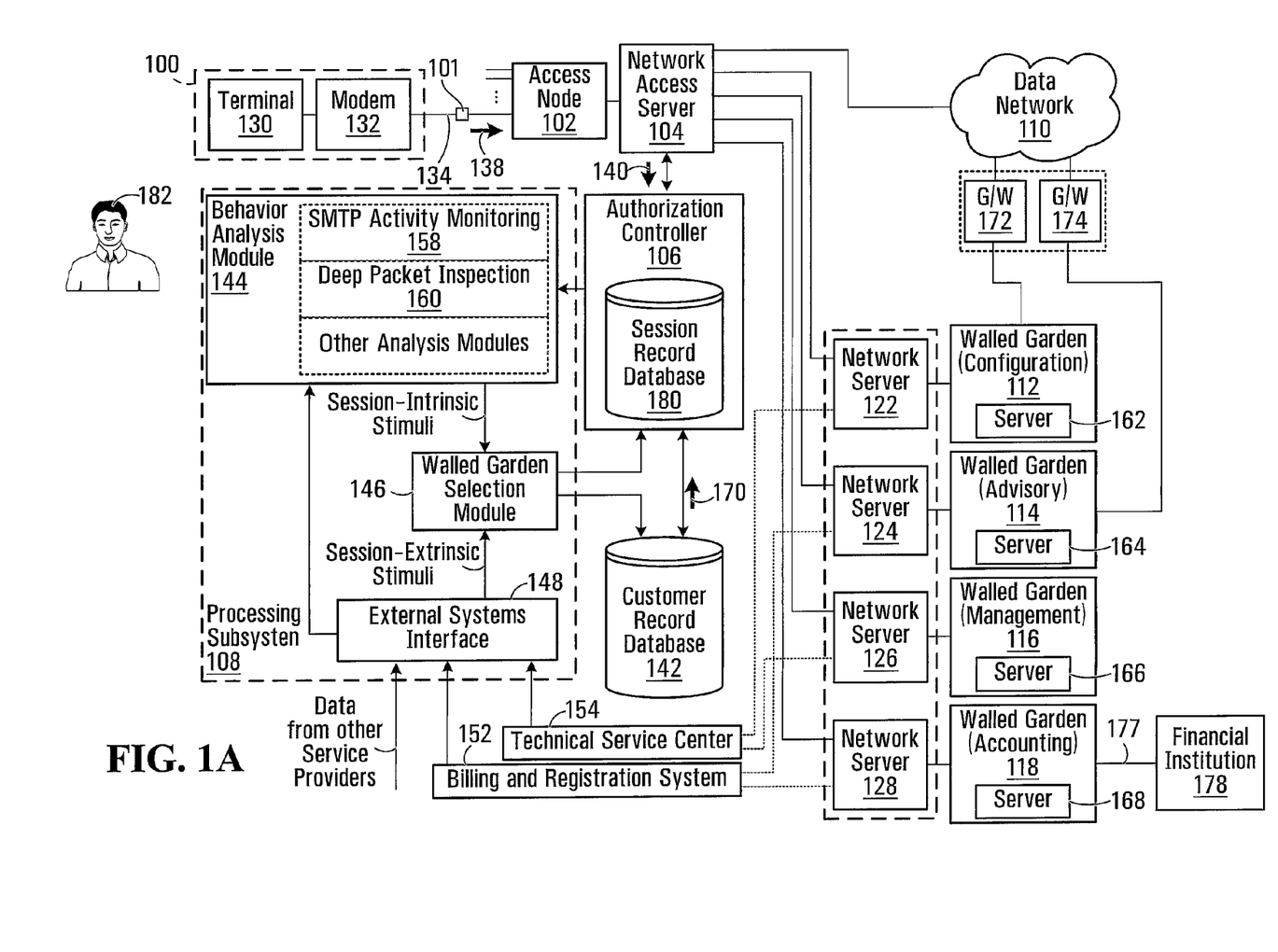
FIGS. 1A and 1B show a network architecture including a communication device, a network access server, an authorization controller, a processing subsystem and a plurality of walled gardens.

With reference to FIG. 1A, there is shown a network architecture including a customer premises 100, a splitter 101, an access node 102 (such as a digital subscriber line access multiplexer (DSLAM)), a network access server 104, an authorization controller 106, a customer record database 142 and a processing subsystem 108. In addition, there is provided a data network 110 (which may be an Intranet, the Internet, or another data network) and a plurality of walled gardens. In this case, four walled gardens 112, 114, 116, 118 are illustrated. However, it should be understood that in general, there are at least two walled gardens, while there is no upper limit on the number of walled gardens that may be provided.

The network access server 104 operates as a gateway to the data network 110 and to the walled gardens 112, 114, 116, 118, which are accessible via respective network servers. For example, in the illustrated embodiment, the network access server 104 is connected to walled garden 112 by a network server 122, to walled garden 114 by a network server 124, to walled garden 116 by a network server 126 and to walled garden 118 by a network server 128. Each of the network servers 122, 124, 126, 128 operates as a gateway to the respective walled garden. In a variant, the distinction among the network servers 122, 124, 126, 128 is purely logical as they may all reside on a single server. In fact, it is envisaged that in certain embodiments, the network access server 104 may have the additional functionality of one or more of the network servers 122, 124, 126, 128.

In addition to being reachable directly from the network access server 104, the data network 110 may also be reachable from one or more of the walled gardens 112, 114, 116, 118. In the illustrated embodiment, the data network 110 is reachable from walled garden 112 via a gateway 172 and from walled garden 114 via a gateway 174, and is not reachable from walled garden 116 or walled garden 118. Generally speaking, however, the data network 110 may be reachable via any combination of walled gardens ranging from none to all of the walled gardens 112, 114, 116, 118. If the data network 110 is reachable via no walled garden, then the data network 110 should be reachable directly from the network access server 104. However, if the data network 110 is reachable via at least one of the walled gardens 112, 114, 116, 118, then it is not necessary for the data network 110 to be reachable directly from the network access server 104.

The network access server 104, the authorization controller 106, the customer record database 142, the processing subsystem 108 and one or more of the walled gardens 112, 114, 116, 118 are operated by a "service provider", which in an example can be an Internet service provider (ISP). The customer premises 100 is associated with a customer 182 who has a business relationship with the service provider.

The customer premises 100 comprises a terminal 130 and a modem 132, each of which may act as a communication endpoint. The modem 132 may be integrated with the terminal 130 or it may be a separate unit that belongs to the customer 182 or which has been loaned, purchased or received from the service provider.

In the illustrated embodiment, the modem 132 is connected between the terminal 130 (e.g., a computer) located at the customer premises and a communication link 134 also located at the customer premises. The communication link 134, which may be shared between the modem 132 and one or more telephony devices (not shown) at the customer premises 100, can be connected via the public switched telephone network (PSTN) to the splitter 101, which is connected to the access node 102. The splitter 101 separates data communications arriving via the communication link 134 (as well as other communication links) from voice-band calls arriving via the communication link 134 (and the other communication links). In the reverse direction, the splitter combines data communications destined for the modem 132 with voice-band calls destined for the one or more telephony devices located at the customer premises. Data communications are exchanged via the DSLAM 102 and the network access server 104, while the voice-band calls are exchanged via areas of the PSTN and potentially other networks capable of carrying voice-band calls. By "data communications" are meant communications established using datagrams or packets, which may convey video, audio, e-mail, VoIP calls, Internet browsing commands and responses, etc.

In another embodiment (not illustrated), the modem 132 is connected between the terminal 130 located at the customer premises and a return cable TV link also located at the customer premises. The return cable TV link is connected via a private cable TV network to an aggregator, where multiple return data transmissions are collected and transmitted to the network access server 104. In still another embodiment (not illustrated), the customer premises 100 is implemented as a device (e.g., a networked personal digital assistant) that combines the modem 132 and the terminal 130. In this case, the customer premises 100 communicates over a wireless link with a mobile switching center. The mobile switching center, which is connected to the network access server 104, can have functionality similar to that of the aforementioned access node 102.

Figure 4:
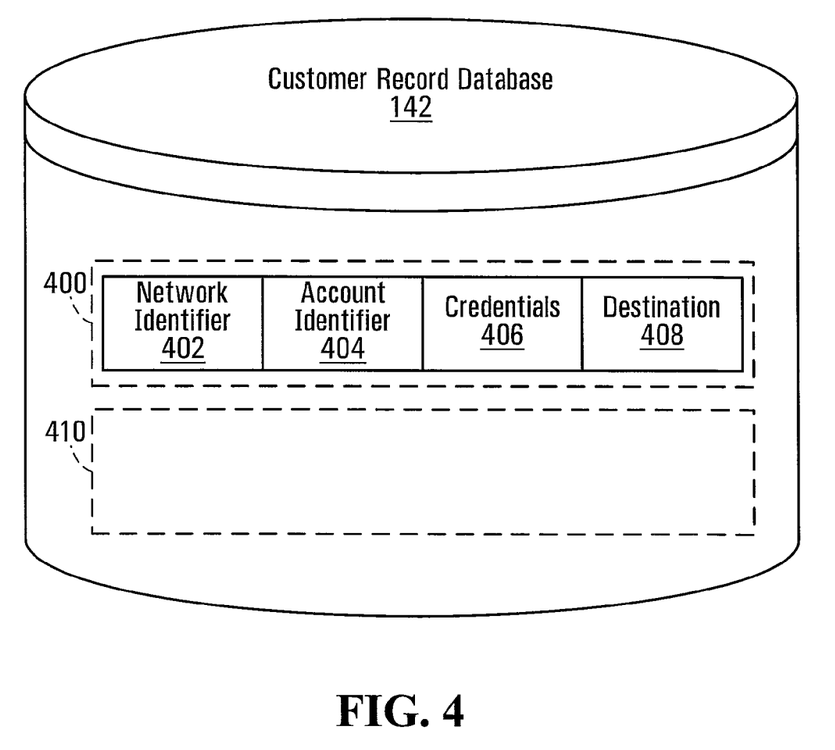
FIG. 4 depicts the contents of the database of customer records, which is populated by the processing subsystem and consulted by the authorization controller upon receipt of an access request.

With additional reference to FIG. 4, the service provider maintains a customer record database 142, which stores a plurality of "customer records" for respective customers, including a customer record 400 for the customer 182 and other customer records 410 for other customers (not shown). Although only the customer record 400 for the customer 182 will now be described in further detail, it should nevertheless be appreciated that an analogous description applies to the other customer records 410 for the other customers (not shown).

Specifically, the customer record 400 for the customer 182 is characterized by a network identifier field 402, an account identifier field 404 and a credentials field 406. The network identifier field 402 indicates how the communication endpoints at the customer premises 100 may be reached. For example, the network identifier field 402 may contain a directory number of the communication link 134 and/or an address of the modem 132 and/or the terminal 130. The network identifier field 402 may include additional information that may be used to identify other equipment located along the path between the customer premises 100 and the authorization controller 106. Generally speaking, it should be understood that other methods by which a provisioning/monitoring system is able to determine the location or circuit from which the modem 132 and/or the terminal 130 is attempting to access the network may be possible without departing from the spirit of the present invention.

For its part, the account identifier field 404 may contain an account identifier such as a username, while the credentials field 406 may contain a set of credentials such as an alpha-numeric password. Of course, those skilled in the art will appreciate that myriad conceivable variants exist and are within the scope of the present invention. Furthermore, one or both of the account identifier field 404 and the credentials field 406 may be selected and/or modified by the customer 182 and/or by the service provider.

The customer 182 can access his or her customer record 400 by supplying an account identifier and a set of credentials that match the contents of the account identifier field 404 and the contents of the credentials field 406, respectively. This information may be supplied in an "access request" 138 from a communication endpoint at the customer premises 100. In an example, not to be considered limiting, the access request 138 may be sent using the PPPoE (Point-to-Point over Ethernet) protocol. In one scenario, the customer 182 wishes to browse the data network 110 using the terminal 130, in which case the access request 138 may be generated by the terminal 130. In another scenario, the access request 138 may be generated by the modem 132 in response to a trigger received from the network access server 104, with the goal of initiating management activities with the modem 132. In still another scenario, initial use of the modem 132 during registration of the customer 182 with the service provider may cause generation of an access request 138 by the modem 132 and/or the terminal 130.

The access request 138 may be formatted in a wide variety of ways without departing from the spirit of the present invention. In its most basic form, the access request 138, when validly pertaining to the customer 182, includes an account identifier and a set of credentials respectively matching the contents of the account identifier field 404 and the contents of the credentials field 406. The access request 138 may also include a data element that is expected to match the contents of the network identifier field 402. For example, the data element may include the directory number of the communication link 134 and/or the address of the modem 132 and/or the terminal 130. The data element may further include a circuit identifier appended to the access request 138 by the access node 102 and also possibly a circuit identifier appended to the access request 138 by the network access server 104.

Of course, the access request 138 may validly pertain to a different customer (not shown), or it might not even be valid in the first place. Assuming that the access request 138 does indeed validly pertain to the customer 182, the matching contents of the account identifier field 404 and the matching contents of the credentials field 406 included in the access request 138 may be inserted upon retrieving them from a memory (either in the modem 132 or in the terminal 130) or they may be entered directly by the customer 182 through interaction with the terminal 130.

The access request 138 is treated by the access node 102 as a data communication and thus the access request 138 is routed to the network access server 104. The network access server 104, which is connected to the authorization controller 106, is operable to send a query 140 to the authorization controller 106 in order to ascertain where to direct the access request 138 received from the customer premises 100. The query 140 may be sent in accordance with a variety of protocols, including but not limited to RADIUS (Remote Authentication Dial In User Service). It should be understood that although the query 140 may have a different format from the access request 138, it may nevertheless still be considered an access request in the generic sense of the expression.

The authorization controller 106, which may be implemented in hardware, software, control logic or a combination thereof, executes a process that may comprise execution of background tasks, which can be interrupted under various circumstances. For example, in order to Service the query 140 from the network access server 104, the authorization controller 106 executes the steps illustrated in FIG. 3A. Specifically, at step 310, the authorization controller 106 receives the query 140 from the network access server 104. At step 320, the authorization controller 106 consults the customer record database 142 to determine whether communication should be routed to the data network 110 or—in the event that the customer is associated with a "conditional access condition"—to a particular one of the walled gardens 112, 114, 116, 118. Communication between the authorization controller 106 and the customer record database 142 may take place using a variety of protocols, including but not limited to LDAP (Lightweight Directory Access Protocol).

In the context of the present invention, a walled garden can be thought of as a limited set of network resources that are reachable by a given customer (such as the customer 182) during a "session" for the given customer. The limited set of network resources are under the control of the service provider so as to permit the activities taking place during a session for the given customer to be monitored and controlled. This contrasts with the much larger set of network resources available in the data network 110, over most of which the service provider has little or no control.

For example, walled garden 112 may comprise resources involved in capturing configuration settings provided by the customer 182 during an initial setup phase. Example resources may include a server 162 for interfacing with a billing and registration system 152 via the network server 122. In addition, the server 162 can be adapted to allow the customer 182 to access the data network 110 via the gateway 172 once the configuration settings have been captured and fed to the aforementioned billing and registration system 152. It is also noted that the server 162 can be programmed to detect if the modem 132 has been improperly configured during the setup phase.

Non-limiting examples of specific situations in which it may be desirable or beneficial to direct the customer 182 to walled garden 112 include instances where the service provider is desirous of:
  separating email access from Internet browsing;
  providing service activation of email;
  providing new service activation;
  providing account reactivation;
  providing an opportunity for the customer to upgrade to a higher level (e.g., of security, virus protection, etc.);
  etc.

For its part, walled garden 114 may comprise resources involved in conveying to the customer 182 information of an advisory nature. Example resources may include a server 164 which is responsive to the customer's acknowledgement of the advisory information. Examples of advisory information range from scheduled network interruptions to password expiry deadlines to hurricane alerts, etc., and which may be provided by a technical service center 154 via the network server 124. In addition, the server 164 can be adapted to allow the customer 182 to access the data network 110 via the gateway 174 once the customer 182 acknowledges the advisory information.

Non-limiting examples of specific situations in which it may be desirable or beneficial to direct the customer 182 to walled garden 114 include instances where the service provider is desirous of:
  issuing a pre-collection notification;
  issuing a notification relating to a planned service interruption;
  issuing a weather warning;
  issuing an update as to remaining download capacity before more must be purchase;
  conveying an advertisement;
  etc.

For its part, walled garden 116 may comprise resources involved in managing sessions for various customers (such as the customer 182). Example resources may include a server 166 for interfacing with the technical service center 154 via the network server 126. The server 166 may be adapted to measure data error rates, issue challenges to the customer premises 100 and analyze responses to those challenges, and so on. Also, as a precaution to minimize the potential damage from misappropriation of an account identifier uniquely associated with management activities and not with an actual customer (hereinafter referred to as a management identifier), it may be desirable to avoid linking walled garden 116 to the data network 110. It is also noted that the server 166 can be programmed to detect if the modem 132 is repeatedly attempting to use a management identifier, thus potentially signaling malicious use or an improper configuration.

Non-limiting examples of specific situations in which it may be desirable or beneficial to direct the customer 182 to walled garden 116 include instances where the service provider is desirous of:
  detecting the use of multiple login credentials simultaneously (i.e., limiting the number of concurrent sessions);
  detecting the use of a modem with incorrect credentials;
  debugging a technical problem related to throughput, etc.;
  detecting/preventing a denial of service attack;
  handling an authentication failure based on legitimate credentials;
  managing a modem non-intrusively;
  etc.

For its part, walled garden 118 may comprise resources involved in alerting the customer 182 to collection problems (and other accounting issues) and allowing the customer 182 to rectify such collection problems by submitting credit card information, debit card information or the like. Example resources may include a server 168 that receives accounting data from the billing and registration system 152 via the network server 128. In addition, the server 168 may have a connection 177 (such as a virtual private network) to one or more financial institutions 178 such as banks or credit providers. Once the customer's collection problems have been rectified, the customer 182 will be able to restart his or her session in order to access the data network 110.

Non-limiting examples of specific situations in which it may be desirable or beneficial to direct the customer 182 to walled garden 118 include instances where the service provider is desirous of:
  collecting an account receivable;
  allowing the customer 182 to change the mode of payment;
  etc.

Still further walled gardens may be provided for the purposes of dealing with illegal or restricted activities; curing the customer 182 of a virus (i.e., quarantine); launching of service trials (which require close monitoring of user behavior and user feedback); providing a guaranteed securely browsable zone (i.e., a different class of Internet service); collection of statistics and/or service level agreement verification; etc.

Continuing now with the description of the customer record database 142 illustrated in FIG. 4, the customer record 400 for the customer 182 is further characterized by a destination field 408 that identifies the entity with which a new session for the customer 182 is to be conducted. Where the customer is associated with a conditional access condition, this entity will be one of the walled gardens 112, 114, 116, 118. Specifically, where a new session for the customer 182 is to be conducted with a particular one of the walled gardens 112, 114, 116, 118, then the contents of the destination field 408 may specify the network server associated with the particular walled garden and, more precisely, the address (such as the IP address) of the network server in question. On the other hand, where a new session for the customer 182 can be initiated without having to pass through any of the walled gardens 112, 114, 116, 118, then the contents of the destination field 408 may specify the address of a gateway (not shown) to the data network 110.

Where the network access server 104 implements the network servers 122, 124, 126, 128, then the contents of the destination field 408 may specify an access policy (e.g., an identification of a port through which the new session must pass) to be applied by the network access server 104 to the new session.

Figure 3A:
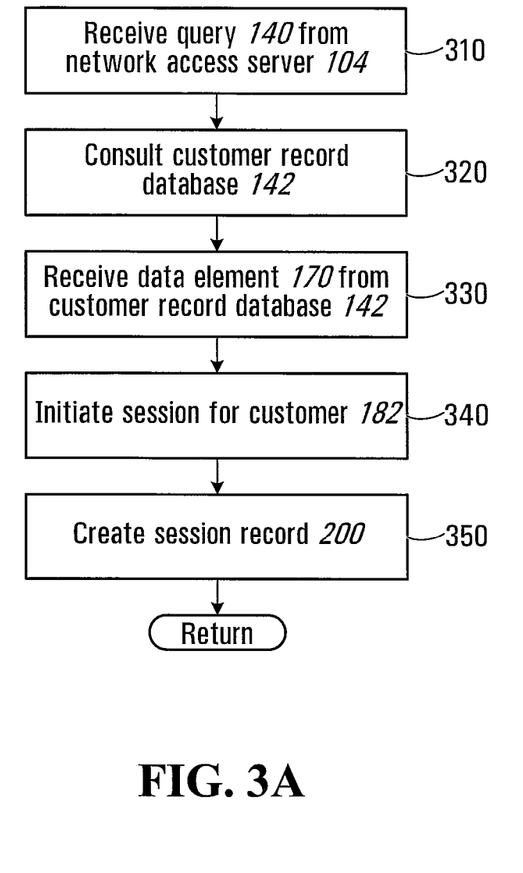
FIG. 3A is a flowchart showing operation of the authorization controller when processing a query from the network access server.

In summary, and with continued reference to FIG. 3A, by accessing the customer record 400 associated with the customer 182 based on the information embedded in the query 140 received from the network access server 104 consequent to the access request 138 issued by a communication endpoint at the customer premises 100, the authorization controller 106 receives, at step 330, a data element 170 from the customer record database 142 identifying the entity (e.g., either a server in the data network 110 or one of the network servers 122, 124, 126, 128) with which the communication endpoint at the customer premises 100 should initiate a session for the customer 182. In a non-limiting example, the data element 170 may be sent by the customer record database 142 in accordance with the RADIUS protocol.

At step 340, the authorization controller 106 initiates a session for the customer 182, such session involving the communication endpoint at the customer premises 100 (i.e., the terminal 130 or the modem 132) and the entity whose identity was learned at step 330 by virtue of being specified in the data element 170. It should be noted that if the access request 138 originated from the terminal 130, then the newly initiated session for the customer 182 will involve the terminal 130, while if the access request 138 originated from the modem 132, then the newly initiated session for the customer 182 will involve the modem 132. By way of non-limiting example, the session may be initiated using the PPPoE protocol.

It should also be understood that nothing prevents two sessions from running concurrently with the customer premises equipment 100, for example one with the terminal 130 and one with the modem 132. The query 140 generated by each communication endpoint will identify a different user for the purposes of the present invention (e.g., one with a customer account identifier and the other with a hardwired modem account identifier), thus allowing the respective communication endpoint to be directed to the appropriate walled garden.

Figure 2:
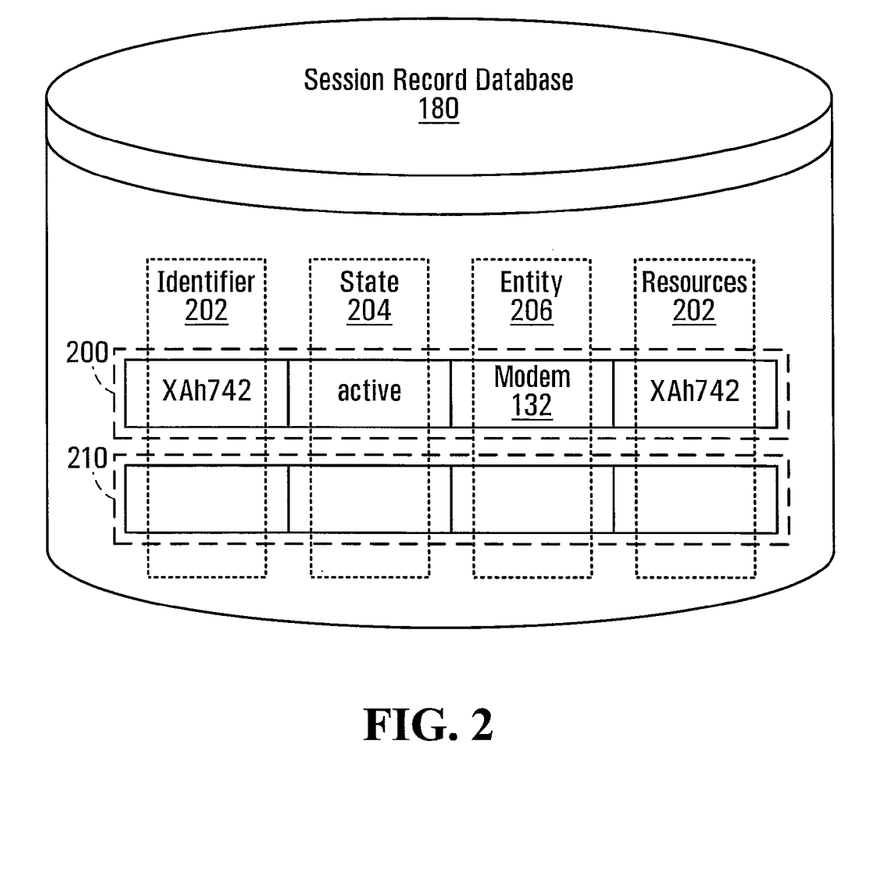
FIG. 2 depicts the contents of a database of session records, for use by the authorization controller in managing sessions.

At step 350, and with additional reference to FIG. 2, the authorization controller 106 creates a "session record" 200 associated with the session initiated at step 340. The session record 200 associated with the session initiated at step 340, as well as other session records 210 associated with other sessions, are stored in a session record database 180 shown in FIG. 1A. Information included in the session record associated with a given session (for a given customer) includes the following information: an identifier field 202 which identifies the given session, a state field 204 which specifies the state (e.g., active, suspended, etc.) of the given session, an entity field 206 which lists the entities involved in the given session and a resource field 208 which lists the local resources assigned to the given session. In the case of the session record 200 associated with the session initiated at step 340, the corresponding state field 204 may specify "active", and the corresponding entity field 206 may include the network identifier of the terminal 130 or the modem 132, depending on the contents of the access request 138.

After step 350, the authorization controller 106 returns to its background tasks, which it may continue executing until a new query is received from the network access server 104. Should a new query be received from the network access server 104, this can be dealt with as described above with reference to FIG. 3A.

In addition, the background tasks being executed by the authorization controller 106 can be interrupted by receipt of a "session management command" from either the network access server 104 or the processing subsystem 108. Should this situation arise, the authorization controller 106 executes a series of steps now described with reference to FIG. 1B (where the session management command is denoted 190A, 190B) and FIG. 3B (where receipt of the session management command is shown as step 360).

Figure 1B:
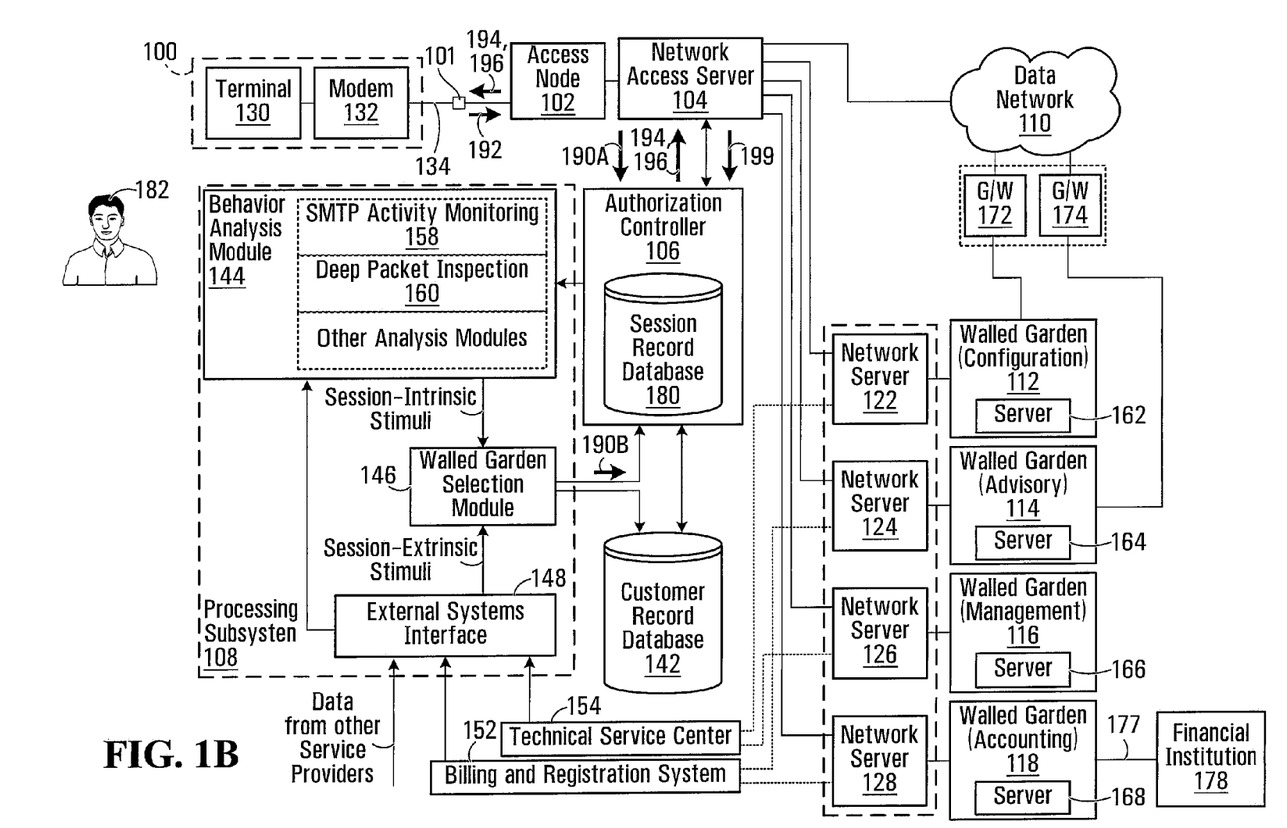

The session management command 190A, 190B pertaining to a particular "target" session identifies one or both entities involved in the target session (i.e., contents of the entity field 206). In addition, the session management command 190A, 190B pertaining to the target session identifies the target session itself, which can be achieved in a number of different ways, e.g., by specifying the target session's identifier (i.e., contents of the identifier field 202). The session management command 190A received from the network access server 104 may be originally generated in various ways known to those of skill in the art. On the other hand, generation of the session management command 190B by the processing subsystem 108 results from application of a "walled garden policy", which shall be described herein below.

Figure 3B:
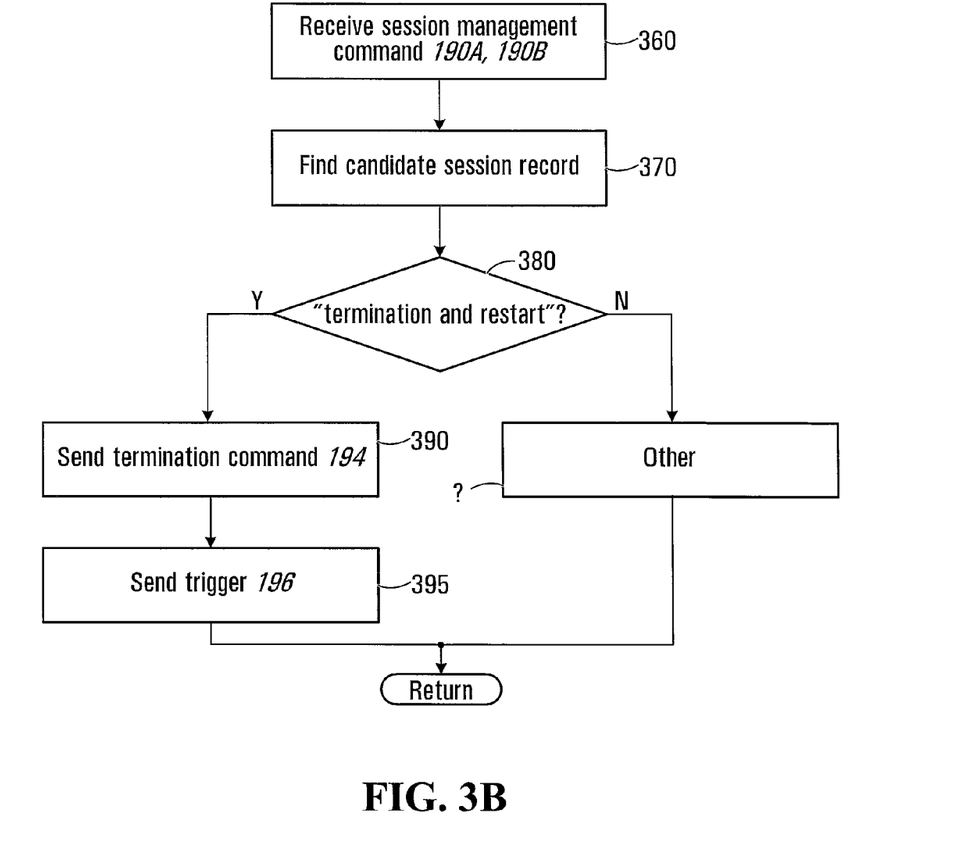
FIG. 3B is a flowchart showing operation of the authorization controller when processing a session management command.

For now, suffice it to say that upon receiving a session management command 190A, 190B that identifies a given modem or terminal, the authorization controller 106, at step 370, searches the entity field 206 of the various session records in the session record database 180 in an attempt to locate a candidate session record for which the contents of the corresponding entity field 206 matches the identity of the given communication endpoint. Assuming that such a candidate session record has been found, then one can say that the candidate session record is associated with an ongoing session for a particular customer.

The session management command 190A, 190B, which has been found to be associated with an ongoing session for a particular customer, may be of a certain type. One example type is "termination and restart". If the session management command 190A, 190B is indeed of the "termination and restart" type, (see step 380, YES branch), then the authorization controller 106 proceeds to step 390 whereby the ongoing session for the particular customer is terminated.

If the session management command 190A, 190B is not of the "termination and restart" type, (see step 380, NO branch), then other processing steps familiar to those skilled in the art can be performed before the authorization controller 106 returns to its background tasks.

In order to terminate the ongoing session for the particular customer, the authorization controller 106 may send a termination command 194 destined for the given modem or terminal listed in the entity field 206 of the candidate session record. In an example non-limiting embodiment, the termination command 194 may be sent using the RADIUS protocol. In addition, the authorization controller 106 may liberate the local resources listed in the resource field 208 of the candidate session record.

In addition, at step 395, the authorization controller 106 issues a trigger 196 to the given modem or terminal that was formerly listed in the entity field 206 of the candidate session record. Thereafter, the authorization controller 106 returns to step 360.

To simplify matters, assume that the given modem or terminal that was formerly listed in the entity field 206 of the candidate session record is the modem 132 illustrated in FIGS. 1A and 1B. The trigger 196 sent at step 395 causes the modem 132 to respond by sending a new access request 192 (similar to the access request 138 issued by the customer premises 100) to the network access server 104.

In one non-limiting example embodiment, the trigger 196 specifies the account identifier and associated credentials to be supplied by the modem 132 when sending the new access request 192. Specifically, this may correspond to the same account identifier and associated credentials that were used in the access request 138, which may have been stored in memory in the session record database 180. In other embodiments, the trigger 196 may specify a special-purpose "management account identifier" and associated "management credentials", which are known by the authorization controller 106 as being associated with management activities. In other words, any communication endpoint sending an access request specifying the management account identifier and the management credentials is to be directed to walled garden 116.

The new access request 192 is then treated in much the same manner as has been described above in respect of the access request 138. That is to say, the network access server 104 receives the new access request 192 and sends a query 199 (similar to the query 140) to the authorization controller 106 in order to ascertain where to direct the new access request 192. The authorization controller 106 then re-executes the process of FIG. 3A, as has been described above.

As can be appreciated from the above, the processing subsystem 108 is responsible for populating the customer record database 142. In the case of the customer 182, the processing subsystem 108 is responsible for populating the destination field 408 of the customer record 400 for the customer 182. In addition, the processing subsystem 108 is responsible for providing the session management command 190B to the authorization controller 106.

To this end, the processing subsystem 108 comprises a plurality of functional modules, including a behavior analysis module 144, a walled garden selection module 146 and an external system interface 148 (which interfaces to external systems such as the aforementioned billing and registration system 152 and the aforementioned technical service center 154, as well as service providers other than the current service provider, and so on). The functional modules of the processing subsystem 108 will now be described in greater detail herein below.

The walled garden selection module 146 may be implemented in hardware, software, control logic or a combination thereof. The walled garden selection module 146 controls the contents of the destination field 408 of the customer record 400 for the customer 182. Thus, the entity with which a new session for the customer 182 is to be conducted can be changed over time to specify a different one of the network servers 122, 124, 126, 128 (or a server in the data network 110), depending on current parameters.

In addition, the walled garden selection module 146 is operable to inform the authorization controller 106 as to whether a current session for the customer 182 should be terminated and restarted. Specifically, this information can be conveyed in the form of the previously described session management command 190B, which may be of the "termination and restart" type. It is recalled that the session management command 190B specifies the identity of the modem 132 or the terminal 130.

It is envisaged that sending the session management command 190B after setting the contents of the destination field 408 of the customer record 400 for the customer 182 to a particular network server may be useful in forcing the customer 182 to terminate an ongoing session and enter the corresponding walled garden thereafter. On the other hand, if the aforementioned change to the contents of the destination field 408 of the customer record 400 for the customer 182 is not followed by issuance of the session management command 190B, the customer 182 will not be steered into the corresponding walled garden until a new session for the customer 182 is initiated by other means.

The walled garden selection module 146 makes its decisions regarding updating the customer record database 142 and issuing of the session management command 190B on the basis of a "walled garden policy" that takes into consideration changes in stimuli received from two main sources. A first source of stimuli is received from the external systems interface 148 and can be termed "session-extrinsic stimuli", as it is not based on ongoing sessions for customers. The session-extrinsic stimuli pertaining to the customer 182 may include, without limitation:

accounting data regarding certain customers (e.g., the financial standing of the customer 182), received from the billing and registration system 152;

advisory parameters regarding certain customers (e.g., a service announcement affecting the customer 182 and possibly other customers simultaneously), received from the technical service center 154;

configuration data regarding certain customers (e.g., a list of registered customers that have not yet configured their modems), received from the billing and registration system 152; or a request for further account information, received from a customer service representative;

management data regarding certain customers (e.g., a request to trigger a management session, or a list of account identifiers requiring modem management), received from the technical service center 154; or service level agreement (SLA) parameters, received from the billing and registration system 152;

etc.

Various ways of obtaining the aforementioned and other session-extrinsic stimuli from external systems will be known to those of ordinary skill in the art and, as such, need not be discussed in further detail.

The walled garden selection module 146 processes the various aforementioned session-extrinsic stimuli to determine which users have one or more of an accounting requirement (namely, a need to pass through the accounting walled garden 118), an advisory requirement (namely, a need to pass through the advisory walled garden 114), a configuration requirement (namely, a need to pass through the configuration walled garden 112) and a management requirement (namely, a need to pass through the management walled garden 116). Clearly, it is envisaged that there may be numerous walled garden policies, each meeting the needs of a specified service provider.

The second source of stimuli received by the walled garden selection module 146 comes from the behavior analysis module 144 and can be termed "session-intrinsic stimuli". Specifically, the behavior analysis module 144 monitors the current session for the customer 182 (as well as other ongoing sessions for other customers) and attempts to characterize the data exchanged during such sessions. Thus, the data output by the behavior analysis module 144 is "intrinsic" to the ongoing sessions. Accordingly, the behavior analysis module 144 may comprise one or more of the following data processing modules, which may be implemented in hardware, software, control logic or a combination thereof:

an SMTP activity monitoring module 158, for determining whether electronic mail messages (emails) being sent or received by the customer premises 100 can be characterized as unsolicited mass communication (spam);

a deep packet inspection module 160, for determining whether packets being sent or received by the customer premises 100 contain malicious data such as a virus or worm;

etc.

In addition to receiving information about the packets exchanged during the current session for the customer 182, the behavior analysis module 144 may also receive input from external systems via the external systems interface 148. For example, in order to detect a particular virus or worm, information may be obtained from an "institute of electronic health" such as an anti-virus software company. Also, in order to detect spam, data may be received from other service providers (e.g., specifying the email addresses or IP addresses of known spammers), and this data may be compiled in the behavior analysis module 144.

The output of the behavior analysis module 144 includes the following non-limiting examples of session-intrinsic stimuli pertaining to the current session for the customer 182:

data indicative of whether the data being sent or received by the communication endpoint at the customer premises 100 contains a virus or worm;

data indicative of whether the data being sent or received by the customer premises 100 is unsolicited mass communication (spam);

etc.

It should be mentioned that in certain embodiments, certain specific types of session-extrinsic stimuli may be derived from the session-intrinsic stimuli that is received from the behavior analysis module 144. For example, consider the case where the data being sent or received by the customer premises 100 is unsolicited mass communication. Although this may initially be detected by the behavior analysis module 144 and flagged as session-intrinsic stimuli pertaining to a given session, if this scenario occurs several times, then it may be indicative of a characteristic associated with the customer 182 rather than with an isolated communication event in the given session. In other words, the session-intrinsic stimuli, when analyzed further, may reveal certain characteristics that are extrinsic to a given session but nevertheless pertain to the customer 182. Such analysis of the session-intrinsic stimuli to derive session-extrinsic stimuli may be performed by the behavior analysis module 144 and/or the walled garden selection module 146.

Based on the session-intrinsic and session-extrinsic stimuli described above, the walled garden selection module 146 applies the aforementioned walled garden policy in order to identify a particular walled garden (or none of the walled gardens) towards which the customer premises 100 should be directed. An identifier of the particular walled garden (e.g., the address of the network server associated with the particular walled garden) is then sent to the customer record database 142, where it is entered into the destination field 408 of the customer record 400 for the customer 182. In addition, application of the walled garden policy by the walled garden selection module 146 results in a determination of whether or not to send the session management command 190B to the authorization controller 106.

In order to better understand the functioning of the walled garden selection module 146, there is now provided a description of several non-limiting examples of a walled garden policy that may be applied by the walled garden selection module 146.

For example, the customer 182 may need to configure his or her modem 132 for the first time. Application of an example first walled garden policy may result in the walled garden selection module 146 determining that the customer 182 needs to be redirected to walled garden 112 (i.e., the "configuration walled garden"). Accordingly, the walled garden selection module 146 may populate the destination field 408 of the customer record 400 for the customer 182 with the address of network server 122, which is a gateway to walled garden 112. Once the customer 182 enters the necessary configuration information, and this is confirmed by the server 162, the customer 182 may then access the data network 110.

Alternatively or in addition, the service provider may wish to announce to the customer 182 an advertisement. Application of an example second walled garden policy may result in the walled garden selection module 146 determining that the customer 182 needs to be redirected to walled garden 114 (i.e., the "advisory walled garden"). Accordingly, the walled garden selection module 146 may populate the destination field 408 of the customer record 400 for the customer 182 with the address of network server 124, which is a gateway to walled garden 114. Once the customer 182 acknowledges the advertisement, the customer 182 may then access the data network 110.

As a further example, the customer 182 may have a collection problem, while also wishing to be advised of scheduled network interruptions. Application of an example third walled garden policy may result in the walled garden selection module 146 determining that it is more important for the customer 182 to rectify his or her collection problem than to be advised of any network interruptions. Accordingly, the walled garden selection module 146 may populate the destination field 408 of the customer record 400 for the customer 182 with the address of network server 128, which is a gateway to walled garden 118 (i.e., the "accounting walled garden"). If resolution of the collection problem cannot wait until the next time that the customer 182 issues a new access request, then according to the example third walled garden policy, the walled garden selection module 146 issues a session management command 190B to the authorization controller 106. On the other hand, if resolution of the collection problem can wait until the next time that the customer 182 issues a new access request, then according to the example third walled garden policy, the walled garden selection module 146 need not issue a session management command 190B to the authorization controller 106.

It should be noted that as soon as the collection problem is resolved, this information will be transmitted from server 168 in walled garden 118 to the billing and registration system 152. In turn, the billing and registration system 152 will realize that there is no more collection problem for the customer 182, which will cause it to release accounting data reflecting this state to the external systems interface 148. Subsequently, continued application of the walled garden policy by the walled garden selection module 146 will result in a need to change the contents of the destination field 408 of the customer record 400 for the customer 182. Specifically, therein may be placed the address of network server 124, which is a gateway to walled garden 114 dealing with issues of an advisory nature.

In another example, the customer 182 may have a minor accounting problem, while also experiencing technical difficulties with his or her connection. Application of an example fourth walled garden policy may result in the walled garden selection module 146 determining that the connection difficulties need to be resolved as a priority over the accounting problem, by triggering a management session with the modem 132. Under these conditions, the walled garden selection module 146 may populate the destination field 408 of the customer record 400 for the customer 182 with the address of network server 126, which is the gateway to walled garden 116 (i.e., the "management walled garden"). In addition, as part of the example fourth walled garden policy, it may be considered that the technical difficulties are so serious that they require the customer 182 to be immediately redirected to walled garden 116, regardless of the fact that there may be an ongoing session for the customer 182. Accordingly, the walled garden selection module 146 may issue a session management command 190B of the "termination and restart" type, specifying the modem 132.

As a result, the technical difficulties can be resolved by way of a management session established between the modem 132 and walled garden 116. To be precise, after the session management command 190B has terminated the ongoing session with the modem 132, the modem 132 is triggered to make a new access request 192 using the customer's 182 account identifier and credentials. This new access request 192 is recognized by the authorization controller 106 as having been made by the customer 182 and, due to the aforementioned change to the contents of the destination field 408 of the customer record 400 for the customer 182, a session is established between the modem 132 and the network server 126, which can be termed a management session.

Another way to establish a management session is as follows. After the session management command 190B has terminated the ongoing session with the modem 132, the modem 132 is triggered to make a new access request 192 using a special-purpose "management account identifier" and associated "management credentials". This new access request is recognized by the authorization controller 106 as a special-purpose request for a management session and, accordingly, a management session is automatically established between the modem 132 and the network server 126.

After successful resolution of the technical difficulties, this milestone may be conveyed to the technical service center 154 by the server 166, and the new state of affairs (i.e., no more technical difficulties) is reflected in the data sent back to the processing subsystem 108 via the external systems interface 148. Consequently, continued application of the walled garden policy by the walled garden selection module 146 will result in a change to the contents of the destination field 408 of the customer record 400 for the customer 182 to specify the address of an updated entity. If the collection problem is deemed serious, such updated entity may be network server 128 (associated with walled garden 118, which is the "accounting walled garden"). Alternatively, if the collection problem is deemed minor, such updated entity may be a gateway to the data network 110, i.e., the next time that a communication endpoint at the customer premises 100 makes an access request (such as access request 138), it will be given unrestricted access to the data network 110.

It should again be emphasized that the above examples are not limitations, but rather expose the fact that the walled garden policy applied by the walled garden selection module 146 can be tailored to any specific requirements of the service provider.

It should also be appreciated that by dynamically changing the walled garden specified in the destination field 408 of the customer record 400 for the customer 182, a communication endpoint at the customer premises 100 can be caused to go through the process of initiating sessions with the various walled gardens, in a sequence of choice, before gaining access to the data network 110.

While specific embodiments of the present invention have been described and illustrated, it will be apparent to those skilled in the art that numerous modifications and variations can be made without departing from the scope of the invention as defined in the appended claims.

What is claimed is:

1. A system comprising:
    an authorization controller operable for regulating establishment of sessions over a data network;
    a processing subsystem operable for monitoring the sessions and applying a walled garden policy that includes:
        populating a database with an association between each of a plurality of user accounts and a respective walled garden selected from a common plurality of walled gardens;
        identifying a target session to be terminated and restarted, the target session involving a particular communication endpoint;
        releasing a session management command identifying the target session;
    the authorization controller being further operable for responding to the session management command by:
        terminating the target session;
        triggering the particular communication endpoint to issue a new access request; and
        responding to receipt of the new access request from the particular communication endpoint by:
            consulting the database to identify the walled garden respectively associated with a particular user account identified in the new access request; and
            directing the particular communication endpoint to the walled garden respectively associated with the particular user account,
        wherein the new access request received from the particular communication endpoint comprises an account identifier and a set of credentials and wherein triggering the particular communication endpoint comprises supplying the account identifier and the set of credentials to the particular communication endpoint, and
        wherein the authorization controller is implemented in hardware.

2. The system defined in claim 1, wherein the processing subsystem is operable for continually applying the walled garden policy.

3. The system defined in claim 2, wherein the processing subsystem is operable for dynamically updating the database to reflect continual application of the walled garden policy.

4. The system defined in claim 3, wherein the processing subsystem further comprises:
    an input for gathering session-extrinsic stimuli regarding the user accounts; and
    a walled garden selection module operable for populating the database and identifying the target session based at least in part on the session-extrinsic stimuli.

5. The system defined in claim 3, wherein the processing subsystem comprises:
a behavior analysis module operable for receiving from the authorization controller information regarding ongoing sessions, the behavior analysis module being further operable for processing the information regarding the ongoing sessions to generate session-intrinsic stimuli;
a walled garden selection module operable for populating the database and identifying the target session based at least in part on the session-intrinsic stimuli.

6. The system defined in claim 5, wherein the session-intrinsic stimuli is indicative of whether at least one session is characterized by at least one of (a) having at least one of a virus and a worm and (b) being an unsolicited mass communication.

7. The system defined in claim 6, wherein the behavior analysis module comprises an SMTP activity monitoring module for determining whether at least one session is characterized by being an unsolicited mass communication.

8. The system defined in claim 6, wherein the behavior analysis module comprises a deep packet inspection module for determining whether at least one session is characterized by having at least one of a worm and a virus.

9. The system defined in claim 6, wherein the plurality of walled gardens includes a management walled garden, wherein application of the walled garden policy associates the management walled garden with the particular user account when the target session is characterized by at least one of (a) having at least one of a virus and a worm and (b) being an unsolicited mass communication.

10. The system defined in claim 5, wherein the processing subsystem further comprises:
an input for gathering session-extrinsic stimuli regarding the user accounts;
wherein the walled garden selection module is further operable for populating the database and identifying the target session based at least in part on the session-extrinsic stimuli.

11. The system defined in claim 5, wherein at least one of the walled garden selection module and the behavior analysis module is further operable for: (I) deriving session-extrinsic stimuli regarding the user accounts from the session-intrinsic stimuli; and (II) populating the database and identifying the target session further based on the session-extrinsic stimuli.

12. The system defined in claim 1, wherein the walled garden respectively associated with a given user account is identified by an IP address.

13. The system defined in claim 1, wherein directing the particular communication endpoint to the walled garden associated with the particular user account comprises initiating a session between the particular communication endpoint and a network server associated with the walled garden associated with the particular user account.

14. The system defined in claim 13, wherein said session is a PPPoE session.

15. The system defined in claim 1, wherein said account identifier is a username and wherein said set of credentials is a password.

16. The system defined in claim 1, wherein the new access request comprises a data element indicative of how the particular communication endpoint can be reached.

17. The system defined in claim 1, wherein at least one of the plurality of walled gardens is connected to the data network by a gateway.

18. The system defined in claim 1, wherein at least one of the plurality of walled gardens does not allow a session to be established through it with the data network.

19. The system defined in claim 1, wherein the communication endpoint is a modem.

20. The system defined in claim 1, wherein the communication endpoint is a computing device connected via a modem.

21. The system defined in claim 1, wherein the particular user account is a management user account.

22. A method of applying a walled garden policy to monitored sessions over a data network, comprising:
populating a database with an association between each of a plurality of user accounts and a respective walled garden selected from a common plurality of walled gardens;
identifying a target session to be terminated and restarted, the target session involving a particular communication endpoint;
terminating the target session;
triggering the particular communication endpoint to issue a new access request; and
receiving from the particular communication endpoint the new access request;
consulting the database to identify the walled garden respectively associated with a particular user account identified in the new access request;
directing the particular communication endpoint to the walled garden respectively associated with the particular user account,
wherein the new access request received from the particular communication endpoint comprises an account identifier and a set of credentials, and wherein triggering the particular communication endpoint comprises supplying the account identifier and the set of credentials to the particular communication endpoint.

23. The method defined in claim 22, wherein the walled garden policy is based on session-intrinsic stimuli.

24. The method defined in claim 23, wherein the walled garden policy is further based on session-extrinsic stimuli for a certain set of user accounts including the particular user account.

25. The method defined in claim 24, wherein directing the particular communication endpoint to the walled garden respectively associated with the particular user account comprises initiating a walled garden session between the particular communication endpoint and a network server associated with the walled garden associated with the particular user account.

26. The method defined in claim 25, further comprising:
maintaining a session record for the particular user account, the session record being indicative of ongoing sessions for the particular user account.

27. The method defined in claim 26, further comprising:
updating the session record for the particular user account to reflect the newly initiated walled garden session.

28. A non-transitory computer-readable medium storing computer-readable program code which, when interpreted by an authorization controller, causes the authorization controller to execute a method of regulating the establishment of user sessions over a data network, the method comprising:
populating a database with an association between each of a plurality of user accounts and a respective walled garden selected from a common plurality of walled gardens;
identifying a target session to be terminated and restarted, the target session involving a particular communication endpoint;
terminating the target session;

triggering the particular communication endpoint to issue a new access request; and receiving from the particular communication endpoint the new access request;

consulting the database to identify the walled garden respectively associated with a particular user account identified in the new access request;

directing the particular communication endpoint to the walled garden respectively associated with the particular user account, wherein the new access request received from the particular communication endpoint comprises an account identifier and a set of credentials, and wherein triggering the particular communication endpoint comprises supplying the account identifier and the set of credentials to the particular communication endpoint.

* * * * *